Aug. 28, 1951  M. INGRAM  2,565,501
SALINITY INDICATOR SYSTEM
Filed Oct. 27, 1945
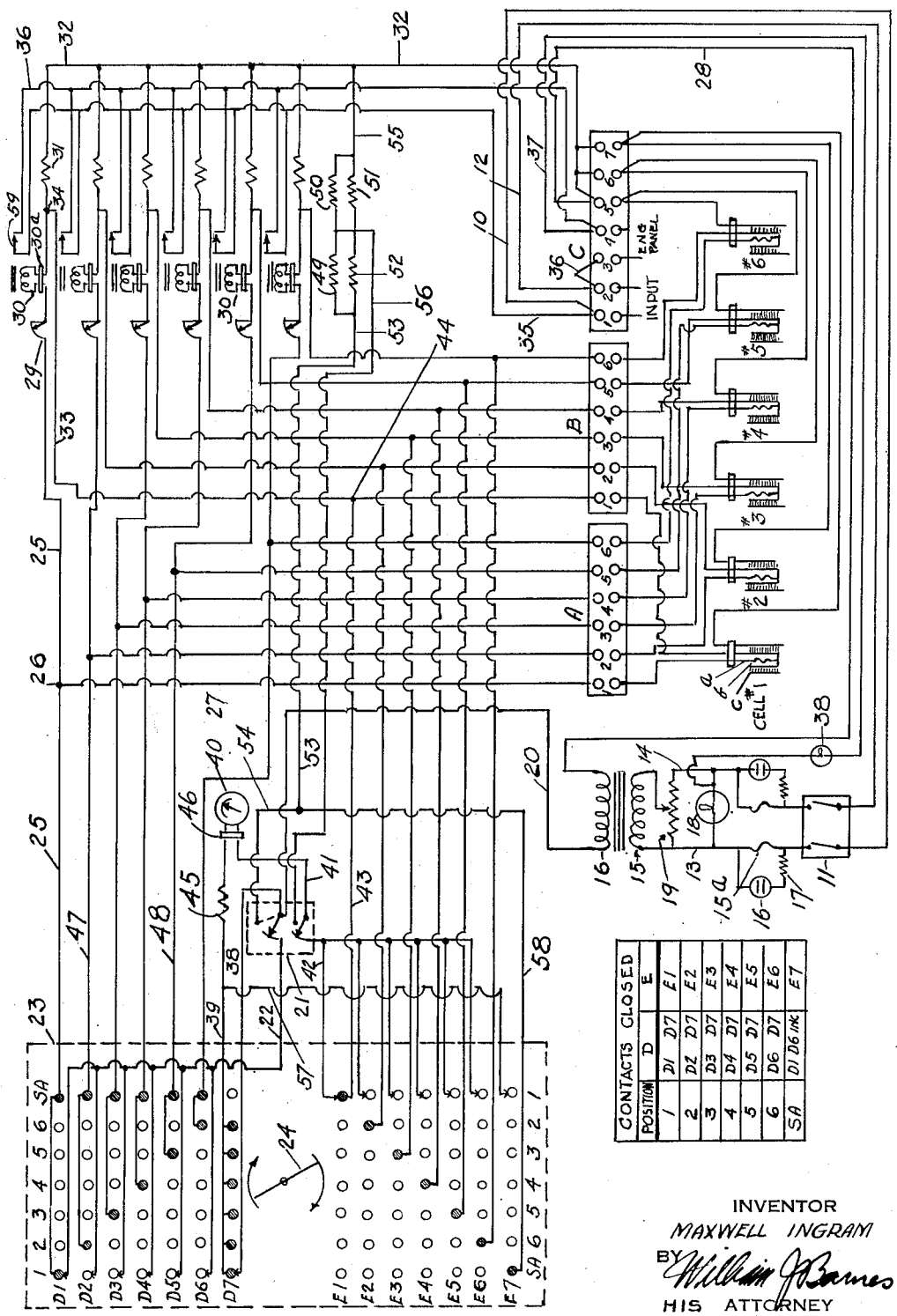
INVENTOR
MAXWELL INGRAM
BY William J Barnes
HIS ATTORNEY Patented Aug. 28, 1951

2,565,501

UNITED STATES PATENT OFFICE 2,565,501

SALINITY INDICATOR SYSTEM

Maxwell Ingram, New York, N. Y., assignor to Pilot Marine Corporation, New York, N. Y., a corporation of New Jersey Application October 27, 1945, Serial No. 625,047

4 Claims. (Cl. 175—183)

This invention relates in general, to a system for determining the amount of dissolved materials in a solution by measuring the electrical conductivity of the solution. More particularly, the embodiment disclosed herein relates to a system for indicating the salinity of liquids, such, for example, as water, and for convenience of description the present embodiment is described in connection with an installation aboard ship. However, it is to be understood that the application of the present invention is not confined thereto, but on the contrary it is equally applicable to power plants, manufacturing plants and many other installations where it may be desired to determine the presence of dissolved solids which are objectionable because of resulting formation of scale in boiler tubes, contamination of fresh water in condensers through leaks, and for other reasons.

On board many ships it is impossible to carry a sufficient quantity of suitable water, i. e., of low salinity, for the boilers, condensers, engines, etc., and accordingly evaporators are provided to reduce the saline content of sea water so that it may be supplied to the boilers and other shipboard equipment. It is desirable to maintain an accurate check on the salinity of the water leaving the evaporators and at other places in the system, for example, the boiler feed water, condenser and engine cooling water, etc.

The most commonly used method of checking salinity on board ship is by means of a titration process using a solution of silver chloride which reacts with sodium chloride, the most prevalent salt in sea water. But the titration process is subject to numerous objections, the results being dependent upon the freshness of the silver nitrate, the judgment of the operator in determining the titration point, the necessity for correcting the results to compensate for variations resulting from temperature changes of the water under test, the failure to measure salinity due to other chlorides present in the water, etc. Furthermore, the chemical tests afford salinity indications at the test times only and cannot afford a continuous, uninterrupted scanning of salinity at any selected point, or points, in the system.

An object of the present invention, as embodied in a system for use aboard ships, is to provide electrical means for measuring salinity by the conductivity of the water so that a numerical value of salinity will be given and at the same time, if it be desired, visual and audible indications are given when the salinity exceeds a predetermined value. As these means measure the total chlorides present in the water, including magnesium chloride, which usually occurs in the next greatest amount, following sodium chloride, the values obtained are thus more accurate determinations of the actual salinity.

Another object is to provide a means for automatically compensating for temperature variations occurring in the water.

A further object is to provide a system comprising cells which remain in position at the places where salinity indications are desired and are so connected into the system that the salinity at any cell may be read at any time, visual and audible alarms being included in the system also to warn of excessive salinity occurring at the cell.

A still further object is to provide a supervisory alarm by means of which, when all the cells are connected in the system, a warning is given that the salinity at one, or more, cells is excessive. Thereupon the operator may connect one cell at a time to the indicating meter and determine at which location, or locations, the salinity is excessive.

A further object of the invention is to provide a system wherein the voltage applied to the cells used to determine the desired salinities is substantially lower than the voltage commonly supplied aboard ship, thereby reducing the likelihood of injurious shocks to the operators.

Further objects of the invention will be apparent from the following description, taken in conjunction with the drawing which comprises a wiring diagram of the system as applied in a typical shipboard installation.

In general, the board idea of the present invention is to impress a voltage across a combination of resistances and measure the resulting drop across one of the resistances when another is varied. As illustrated and described herein, this combination comprises the resistance of the saline solution under test as it flows between cell electrodes immersed in it. As is well known, the resistance of a saline solution decreases with increases in temperature so that salinity indications are inaccurate unless some special means are provided for correcting errors resulting from temperature variations. The second element of the combination therefore includes a resistance having a negative temperature co-efficient of resistance. The third element of the combination comprises a relay and an associated variable resistance whereby visual and audible signals may be operated whenever the salinity of the solution under test exceeds a pre-selected value. The fourth and final element of this combination is a balancing resistance network.

It will be understood that whenever the salinity of the solution under test varies, its resistance varies, and a corresponding change in voltage drop occurs across the other elements of the combination and may be measured by a suitable meter.

The elements of this combination and the associated circuits in which they are included will now be described.

Referring to the lower right hand portion of the drawing, it will be noted that a series of six cells are shown. These cells are located at places at which the desired salinity measurements are to be made. For example, cell #1 may be located in the boiler feed line, cell #2 in the evaporator discharge line, cell #3 in a Diesel cooling system, and the remaining cells in other desired places. It will be appreciated that the number of cells will vary according to the number of locations at which salinity indications are to made, six such cell locations having been shown in the drawing, for convenience.

Each cell may comprise two spaced electrodes, an inner electrode $b$ and an outer surrounding electrode $c$ between which the solution, the salinity of which is to be measured, flows. The detailed construction of a preferred embodiment of a cell is disclosed and claimed in my copending application Serial No. 670,003, filed May 15, 1946, now Patent No. 2,533,462, and will not be described herein since its specific construction is not essential to the operation of the present system.

Associated with each cell and preferably in close thermal and physical relation so as to be subjected to the same temperature, is a resistor $a$ having a negative temperature-resistance characteristic whereby when the resistance of the solution under test between the electrodes $b$ and $c$ varies in one direction, or the other, caused by a change in temperature, the resistance of $a$ will vary proportionately in the same direction and thus compensates for temperature changes in the solution under test.

As indicated, each cell has three terminals connected to three junction blocks designated as A, B and C. All of the resistances $a$ are connected to junction block A; thus resistance $a$ in cell #1 is connected to terminal 1 of block A, resistance $a$ in cell #2 is connected to terminal 2 of block A, resistance $a$ in cell #3 is connected to terminal 3 of block A, etc. All of the inner electrodes $b$ are connected to junction block B; thus inner electrode $b$ of cell #1 is connected to terminal 1 of block B; inner electrode $b$ of cell #2 is connected to terminal 2 of block B, etc. The six outer electrodes $c$ are connected to terminals 5, 6 and 7 of junction block C; thus the outer electrodes $c$ of cells #1 and #2 are connected to terminal 7 of block C; outer electrodes $c$ of cells #3 and #4 are connected to terminal 6 of block C and the outer electrodes $c$ of cells #5 and #6 are connected to terminal 5 of block C.

As is well known, the resistance of a saline solution to the passage of an electric current varies in inverse proportion to the amount of salts which are present in the solution and may be measured by impressing a voltage across electrodes immersed in the solution and measuring the resulting drop in potential in a suitable part of a circuit which includes the path between the electrodes. A means for obtaining a source of potential to be applied across the cell electrodes will now be described.

Referring to the junction block C, the terminals 1 and 2, as indicated by the notation "Input," are connected to the ship's supply which may be, and most frequently is, 115 volts A. C. From terminal 1, a conductor 10 leads to one side of a double pole, single-throw line switch 11 and from terminal 2 another conductor 12 leads to the other side of this switch. From the other terminals of the switch 11, conductors 13 and 14 lead to the primary winding 15 of a transformer, the secondary 16 of which may have an output of about 20 volts. As this is the voltage, part of which is impressed across the cell electrodes, it will be appreciated that the likelihood of injurious shock to operators of the system is practically non-existent. The line conductors 13 and 14 preferably have fuses 15a to protect the system and with each fuse there is preferably associated a shunted circuit comprising a neon lamp 16 and resistance 17. The purpose of the neon lamps is to indicate when the fuses have been blown. A pilot light 18 may be connected between the conductors 13 and 14 to afford a visual indication when the line switch 11 is closed. An adjustable voltage divider 19 is placed across the input of the transformer and may be adjusted as necessary to compensate for prolonged variations of the line voltage on either side of 115 volts.

Before describing the circuit which includes the secondary 16 of the transformer, it will be helpful to point out that the voltage of this secondary is impressed across the combination of resistances previously referred to, including the solution under test between the inner electrode $b$ and the outer electrode $c$ of a cell, the temperature compensating resistance $a$ in the cell, the indicating meter and the relay for operating visual, or audible, indicators of excessive salinity. This relay has associated with it an adjustable resistance whereby the relay may be adjusted to operate for any desired salinity value. This combination also includes a circuit balancing resistance connected in parallel across the cell electrodes $b$ and $c$.

These elements of the system may now be described in greater detail with reference to the inclusion of cell #1 in the circuit: beginning at the left hand side of the transformer secondary 16, a conductor 20 leads to one terminal of a double-pole double-throw switch 21, which is normally closed in one direction, as indicated by the full lines. From the opposite side of the switch, a conductor 22 leads to a selector switch 23. This switch, which may be, and preferably is, of the drum type, comprises two groups of contacts, the upper group being designated generally as the "D" group and the lower as the "E" group. Movable contacts, as indicated by the arrows, are adapted to be placed in the various vertical columns marked 1, 2, 3, 4, 5, 6 and SA, thereby closing the contacts, as given in the chart shown in the drawing and designated as "Contacts Closed." The various contacts which become energized are also shown as shaded in the drawing. Having assumed that we desire to place cell #1 in the circuit, the movable element of the selector switch, as represented by the numeral 24, is rotated to a position designated as 1 (left hand column in part D and right hand column in part E), and it will be observed that in such position, contacts, D1, D7 and E1 are closed.

Returning now to the conductor 22, when the selector switch is in the position 1, as above noted, current will flow through this conductor across contact D1, to contact SA and thence through the conductor 25. From the junction point 26 on this conductor, a conductor 27 leads to terminal 1 of the junction block A which is connected to the compensating resistance $a$, as previously described. The other side of this resistance is connected to the inner electrode $b$. The circuit is completed across the solution under test, to the outer electrode $c$, which is connected to terminal 7 of junction block C; terminals 5, 6 and 7 of this block are connected together, as shown, and a conductor 28, leading from terminal 5, is connected to the right hand side of the transformer secondary 16. It will be understood from this description, therefore, that the voltage of the secondary 16 is impressed across the compensating resistance $a$ and the electrodes $b$ and $c$.

As previously mentioned a relay for operating an indicator of excessive salinity, and a balancing resistance, are connected across the resistance $a$ and the cell electrodes $b$ and $c$, respectively. The circuit through these elements may be traced as follows: beginning at the junction point 26 on conductor 25 in the upper part of the drawing: conductor 25, extending to the right of this junction point, an adjustable resistance 29, relay 30, balancing resistance 31 and conductor 32 leading to the terminals 5, 6 and 7 of junction block C. As previously mentioned, one of these terminals 5 is connected by the conductor 28 to the transformer secondary 16. This circuit also includes a conductor 33 leading from the junction point 34 between the relay 30 and the balancing resistance 31 to terminal 1 of the junction block B.

Each relay 30 has associated with it an armature 59 adapted to close an alarm circuit whenever the voltage across the input of the relay exceeds a predetermined value which may be controlled by means of the adjustable resistance 29. This alarm circuit may be traced from terminal 1 of junction block C as follows: conductor 35, armature 59, conductor 36, leading to terminal 4 of the junction block C. As indicated by the notation "ENG Panel," conductors may lead from the terminals 3 and 4 to a remote position such as a panel in the engine room, and may include visual and audible indicators functioning when the armature 59 completes the alarm circuit. From the terminal 3, a jump connection 36 completes the alarm circuit to terminal 2 on the other side of the input. Returning to the terminal 4, a conductor 37 leads to a pilot light 38 which is connected to the right hand side of the input to the transformer primary 15; and thence back through the fuse connection and line switch 14, through the conductor 12 to the terminal 2 of the junction block C.

The relays 30 are of the direct current type, having associated with them selenium or other suitable types of rectifiers 30a. Each relay resistance 29 is adjusted so that when the salinity of the cell with which it is associated exceeds a certain predetermined value, the relay armature 59 closes the alarm circuit previously described, thereby giving visual and audible indications not only on the engineer's panel but also at the place where the alarm light 38 is situated.

At the same time that the voltage of the transformer secondary 16 is impressed across the circuit, which includes the cell electrodes $b$ and $c$, a salinity indicating meter is connected across a part of the circuit; for example, that part which contains the relay 30. This circuit may be traced as follows: beginning at the switch 21— from the upper entrance side of the switch a conductor 38 leads to the selector switch 23 and with the movable member thereof in position 1, contact D7 is closed. A conductor 39 leads from this contact to the meter 40, from which a conductor 41 leads to the lower entrance terminal of the switch 21. From the opposite side of this switch, conductor 42 leads to the contact E1 and thence a conductor 43 leads to the junction point 44; thence conductor 33 leads to the junction point 34 located between the relay 30 and the balancing resistance 31, and to terminal 1 on junction block B.

The meter 40 is preferably a direct current voltmeter calibrated to read directly in grains of salt per gallon. A suitable resistance 45 and a rectifier 46, which may be of the selenium, or copper oxide type, are associated with the meter.

In similar manner, each of the circuits which include the remaining cells, viz., 2–6, inclusive, may be traced through, but to avoid unnecessary repetition, detailed descriptions of these circuits are omitted.

It will be understood that salinity readings may thus be taken at any particular cell locations whenever desired simply by turning the selector switch to that cell position. However, it may be desired to maintain a constant supervisory action and to obtain a warning whenever the salinity at any one, or more, of the cells exceeds a predetermined value. To accomplish this so-called supervisory alarm, a circuit is employed in which all of the cells are connected in parallel so that when the salinity at any one, or several, of the cells exceeds the predetermined value, an alarm signal will be given. The operator may then turn the selector switch into the various cell positions and thereby determine at which of the various cells the salinity exceeds the desired value.

In putting the apparatus on the supervisory alarm, the selector switch is turned to the position designated as SA which closes the contacts D1–D6, inclusive, and E7. From the drawing, it will be observed that all cells are now in parallel and for convenience a portion of the circuit including several cells, such as, for example, 2 and 5, may be traced. Beginning at the outlet side of the switch 21, it will be noted that the conductor 22 is connected to contact D2, which is closed. A conductor 47 leads to the second relay 30 in the column of relays shown in the upper right hand part of the drawing. Conductor 22 is also connected to contact D5, which is closed, and a conductor 48 leads to a relay 30, which is fifth in this column of relays. The salinity indicating meter 40 is not operative during supervisory alarm but whenever the salinity at any of the cells exceeds the value for which the relay associated with that cell is set, the associated relay armature closes the alarm circuit, thereby lighting the pilot light and operating the indicating means at the engineer's panel. Thereafter, the operator moves the selector switch arm 24 into its various cell positions and thereby connects the cells in circuit until he finds at which cell locations the salinity is excessive.

A test circuit is provided for the purpose of checking the readings of the salinity meter 40 and for checking the operation of the instrument. This circuit comprises a combination of four fixed resistances 49, 50, 51 and 52, arranged as shown below the series of relays 30, and across which the voltage of the transformer secondary may be impressed. This voltage is impressed by means of the conductor 53 connected with a conductor 54, leading to the uppermost terminal of the switch 21. When the switch arms are in the position represented by the dotted lines, conductor 54 is connected with conductor 26, leading to the left hand side of the transformer secondary 16. From the right hand side of the combination of four resistances comprising the test circuit, a conductor 55 leads to the conductor 32, which, as previously described is connected through the terminal 5 of the junction block C and conductor 28 to the right hand side of the transformer secondary 16.

The salinity indicating meter 40 is connected across two resistances 49 and 52, through the following connections, viz.: conductor 56, switch 21, conductor 41 connected to the meter, and then either conductor 39 or 57, depending on the position of the movable element of the selector switch. If this switch is in any of the positions 1 to 6, contact D7 will be closed so that current can flow therethrough and thence through the conductor 38 to the switch 21, thence through the upper pole of this switch to the conductors 54 and 53 to resistances 49 and 52. On the other hand, if the movable element of the selector switch is in the SA position indicating supervisory alarm, the circuit from the indicating meter 40 includes conductor 57, contact SA, conductors 58 and 53. It will be appreciated that the combination of the four resistances 48, 49, 51 and 52 are similar to the combination which exists when one of the six cells is connected in the circuit. Resistance 49 is analogous to the resistance of the relay 30 and its associated resistance 29; resistance 50 is analogous to the balancing resistance 31; resistance 51 is analogous to the resistance to the solution under test between electrodes b and c, and resistance 52 is analogous to the compensating resistance a.

These four resistances 49, 50, 51 and 52 are so selected as to get a particular salinity reading on the meter, say for example, 1 grain per gallon, so that if this reading is not obtained when the test circuit is connected in the circuit, or if no reading at all is obtained, the operator is advised and can make the necessary repairs or adjustments.

Having thus described only one embodiment of the invention, it is not to be understood that it is limited to the details of form or the precise arrangement of parts set forth, for various changes may be made by those skilled in the art without departing from the spirit and scope of the invention as defined in the appended claims reading as follows:

I claim:

1. A system for indicating the salinity of a solution which is subject to variations in temperature and has a predetermined temperature coefficient of resistance, said system comprising a first circuit including a pair of electrodes arranged for the solution to flow therebetween in contact with said electrodes, a second circuit electrically connected in series with said first circuit and including a resistor subject to the temperature of said solution and having a temperature coefficient of resistance approximately the same as that of said solution, a voltage supply, means for impressing voltage from said supply across the series combination of said first and second circuits, voltage measuring means for indicating the conductivity of said solution between said electrodes and electrically connected to measure the voltage drop across said second circuit, and a balancing impedance electrically connected across said first circuit.

2. A system for indicating the salinity of a solution which is subject to variations in temperature and has a predetermined temperature coefficient of resistance, said system comprising a pair of electrodes arranged for the solution to flow therebetween in contact with said electrodes, a resistor electrically connected in series with said electrodes and subject to the temperature of said solution, said resistor having a temperature coefficient of resistance approximately the same as that of said solution, a voltage supply, means for impressing voltage from said supply across the series combination of said resistor and said electrodes, voltage measuring means for indicating the conductivity of said solution between said electrodes and electrically connected to measure the voltage drop across said resistor, and a balancing resistance electrically connected across said electrodes.

3. A system for indicating the salinity of solutions which are subject to variations in temperature and have predetermined respective temperature coefficients of resistance, said system comprising a plurality of independent relay branches electrically connected in parallel, an alarm circuit including an alarm, and means for electrically energizing said relay branches and said alarm circuit, each of said relay branches comprising a first circuit including a pair of electrodes arranged for such a solution to flow therebetween in contact with said electrodes, a second circuit electrically connected in series with said first circuit and including a resistor subject to the temperature of said solution and having a temperature coefficient of resistance approximately the same as that of said solution, and a relay circuit connected across said second circuit, each of said relay circuits including a relay which has a voltage-sensitive element connected in said relay circuit and a pair of output terminals excluded from said relay circuit, said relay being so constructed and arranged as to establish between said terminals a current-carrying path of substantially constant conductivity only when said voltage-sensitive element is subjected to a voltage in excess of a predetermined value, and said alarm circuit including said pairs of relay output terminals electrically connected in parallel with each other and in series with said alarm.

4. A system for indicating the salinity of solutions which are subject to variations in temperature and have predetermined respective temperature coefficients of resistance, said system comprising a plurality of independent relay branches electrically connected in parallel, an alarm circuit including an alarm, a voltage supply, and means for impressing voltage from said supply across said relay branches and said alarm circuit, each of said relay branches comprising a pair of electrodes arranged for such a solution to flow therebetween in contact with said electrodes, a resistor electrically connected in series with said electrodes and subject to the temperature of said solution, said resistor having a temperature coefficient of resistance approximately the same as that of said solution, and a relay circuit connected across said resistor, each of said relay circuits including a relay which has a voltage-sensitive element connected in said relay circuit and a pair of output terminals excluded from said relay circuit, said relay being so constructed and arranged as to establish between said terminals a current-carrying path of substantially constant conductivity only when said voltage-sensitive element is subjected to a voltage in excess of a predetermined value, and said alarm circuit including said pairs of relay output terminals electrically connected in parallel with each other and in series with said alarm.

MAXWELL INGRAM.

REFERENCES CITED

The following references are of record in the file of this patent:

UNITED STATES PATENTS

| Number | Name | Date |
|---|---|---|
| 1,450,023 | Edelman | Mar. 27, 1923 |
| 2,122,363 | Christie | June 28, 1938 |
| 2,150,015 | Witham | Mar. 7, 1939 |
| 2,221,307 | Christie | Nov. 12, 1940 |
| 2,224,382 | Douty | Dec. 10, 1940 |
| 2,306,691 | Ellis | Dec. 29, 1942 |
| 2,370,609 | Wilson et al. | Feb. 27, 1945 |

FOREIGN PATENTS

| Number | Country | Date |
|---|---|---|
| 73,216 | Austria | Mar. 10, 1917 |